(12) United States Patent
Kulhavy

(10) Patent No.: US 6,334,607 B1
(45) Date of Patent: Jan. 1, 2002

(54) ADJUSTABLE LENGTH FLUID SPRING

(75) Inventor: Sava V. Kulhavy, St. Gallen (CH)

(73) Assignee: Cabex AB, Vaduz (CH)

( * ) Notice: Subject to any disclaimer, the term of this patent is extended or adjusted under 35 U.S.C. 154(b) by 0 days.

(21) Appl. No.: 09/445,532

(22) PCT Filed: May 15, 1998

(86) PCT No.: PCT/CH98/00204

§ 371 Date: Mar. 8, 2000

§ 102(e) Date: Mar. 8, 2000

(87) PCT Pub. No.: WO99/53216

PCT Pub. Date: Oct. 21, 1999

(30) Foreign Application Priority Data

Apr. 14, 1998 (CH) ................................................ 849/98

(51) Int. Cl.$^7$ ................................................. F16F 5/00
(52) U.S. Cl. ................................. 267/64.12; 188/322.16
(58) Field of Search ....................... 188/322.16, 322.19, 188/322.2, 300; 267/117, 131, 129, 64.12; 296/76

(56) References Cited

U.S. PATENT DOCUMENTS

| 4,072,288 A | * | 2/1978 | Wirges et al. | 248/404 |
|---|---|---|---|---|
| 4,096,785 A | * | 6/1978 | Wirges | 91/416 |
| 4,124,202 A | * | 11/1978 | Hatakeyama | 267/118 |
| 4,415,135 A | * | 11/1983 | French | 248/161 |
| 4,465,266 A | * | 8/1984 | Hale | 267/131 |
| 4,844,392 A | * | 7/1989 | Bauer et al. | 248/162.1 |
| 5,078,351 A | * | 1/1992 | Gualtieri | 248/161 |
| 5,090,770 A | * | 2/1992 | Heinrichs et al. | 297/347 |
| 5,141,210 A | * | 8/1992 | Bauer et al. | 267/64.12 |
| 5,620,067 A | * | 4/1997 | Bauer et al. | 188/322.19 |
| 5,915,674 A | * | 6/1999 | Wolf et al. | 267/64.12 |

FOREIGN PATENT DOCUMENTS

| DE | 3123577 | 12/1982 |
|---|---|---|
| EP | 0789157 | 1/1997 |

* cited by examiner

*Primary Examiner*—Robert J. Oberleitner
*Assistant Examiner*—Xuan Lan Nguyen
(74) *Attorney, Agent, or Firm*—Browdy and Neimark

(57) ABSTRACT

A fluid spring has a cylindrical housing (1) in whose end sections pieces (12,13) are introduced. A hollow space (20) is configured in one of these end pieces (12), a control device (30) being located in the hollow space (20). The control device (30) has two sealing devices (31,32) and an actuating rod (33) which connects them. The planes of the sealing devices (31,32) do not run parallel to each other.

18 Claims, 4 Drawing Sheets

ADJUSTABLE LENGTH FLUID SPRING

The present invention relates to an lengthwisely adjustable fluid spring with a cylindrical casing, with end pieces of which each one is fitted in one end of the casing, and with a control unit, which is arranged in a cavity of one of the end pieces, said control unit comprising at least two sealing devices and one actuating lever linking said devices.

Such fluid springs are already known and are used e.g. on chairs having seats with adjustable height. The fluid can be a liquid or air. The fluid spring contains a piston inside. The cavity of the end piece connects to the interior of the fluid spring. Further then, a duct connects to the cavity. The duct's far end is linked to the second end piece. This second end piece has an inner canal which stretches between the close end of the overflow port and the interior of the fluid spring.

The flow of fluid between the two sides of the piston is controlled by the control unit whose main part is arranged in the cavity of the first end piece. The actuating lever of this known fluid spring is worked as a straight rod which is positioned vertically along its entire length.

One section of the rod rises axially from the upper side of the fluid spring. The sealing devices being part of this arrangement are fixed at the actuating lever, such as that one sealing device is beneath the other and that they both run in parallel. Due to this type of construction, the height of the stool is enlarged. However, at least in some instances, such a big height of the fluid spring is undesirable.

The object of the present invention is to remove the said as well as even further disadvantages of the fluid spring as it is known.

This object is solved, according to the present invention, with a fluid spring of the foregoing mentioned type as specified in the characterising portion of the patent claim 1.

Figure 1:
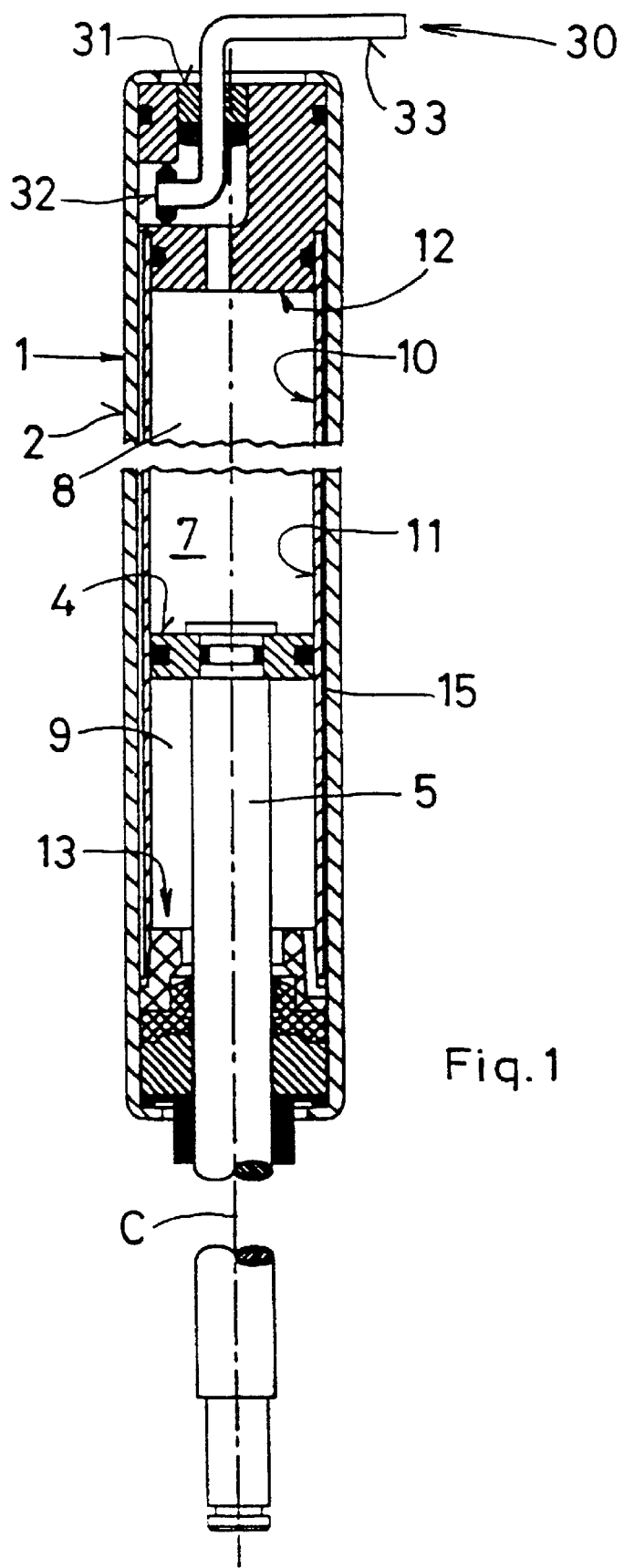
Figure 2:
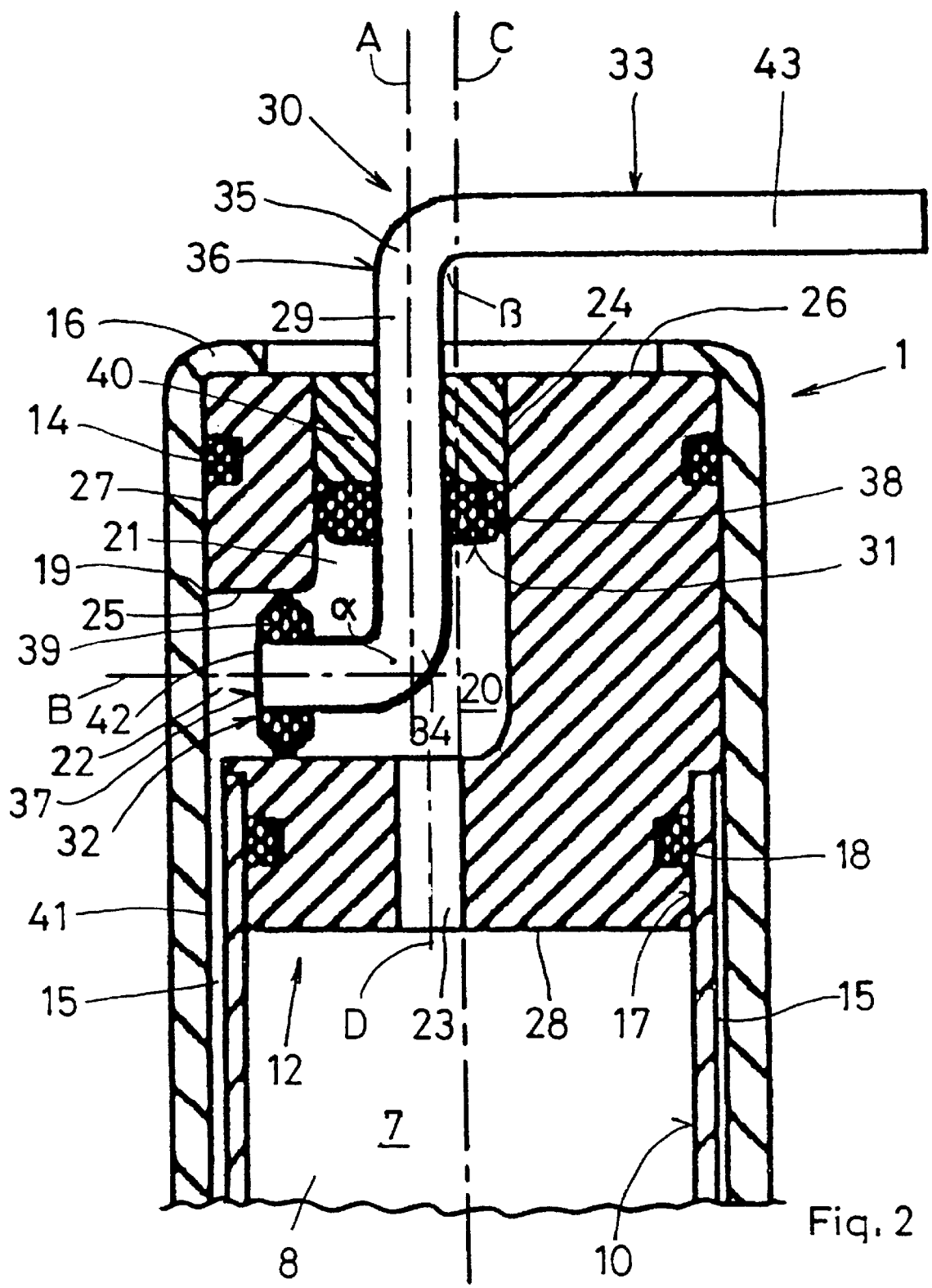
Figure 3:
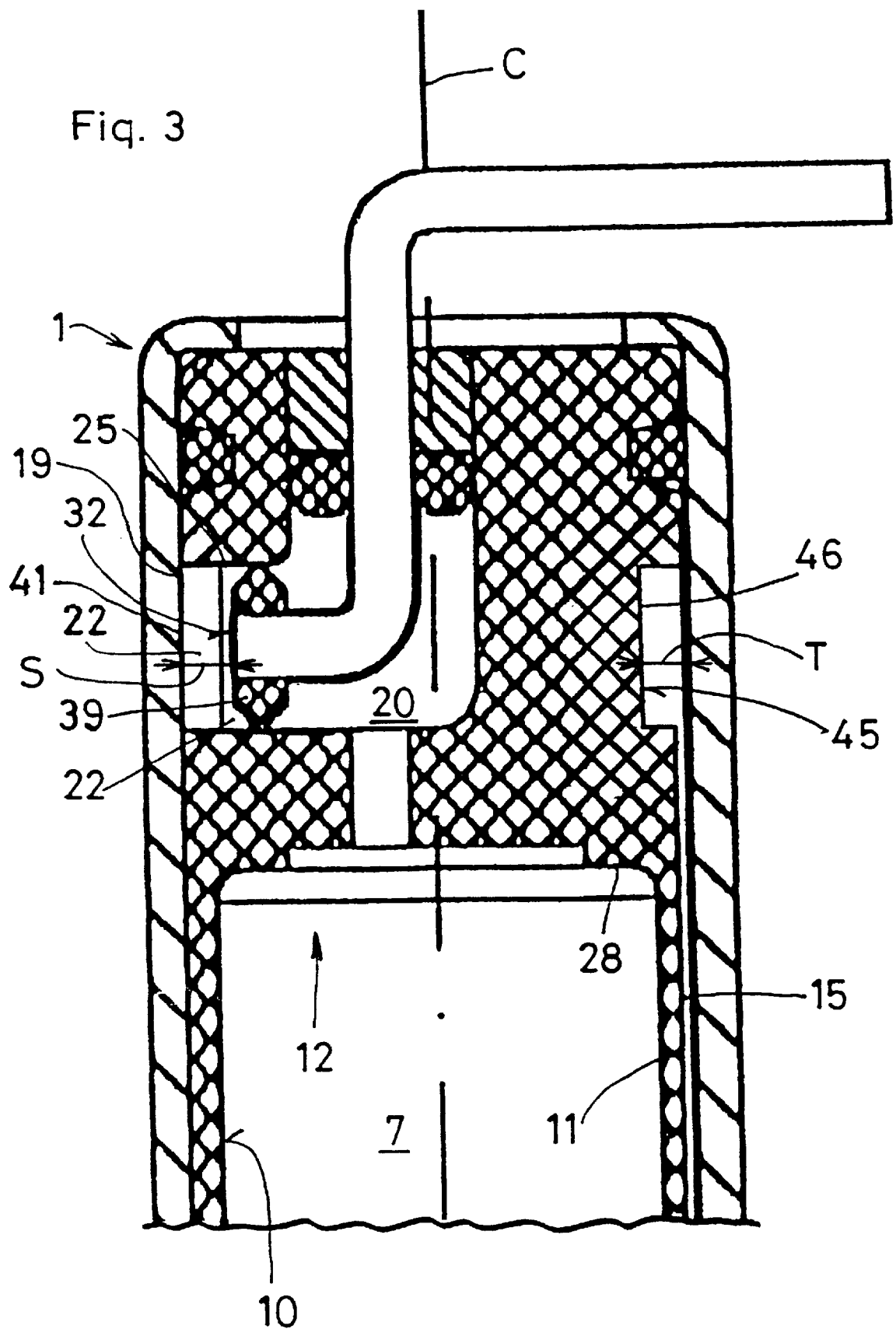
Figure 4:
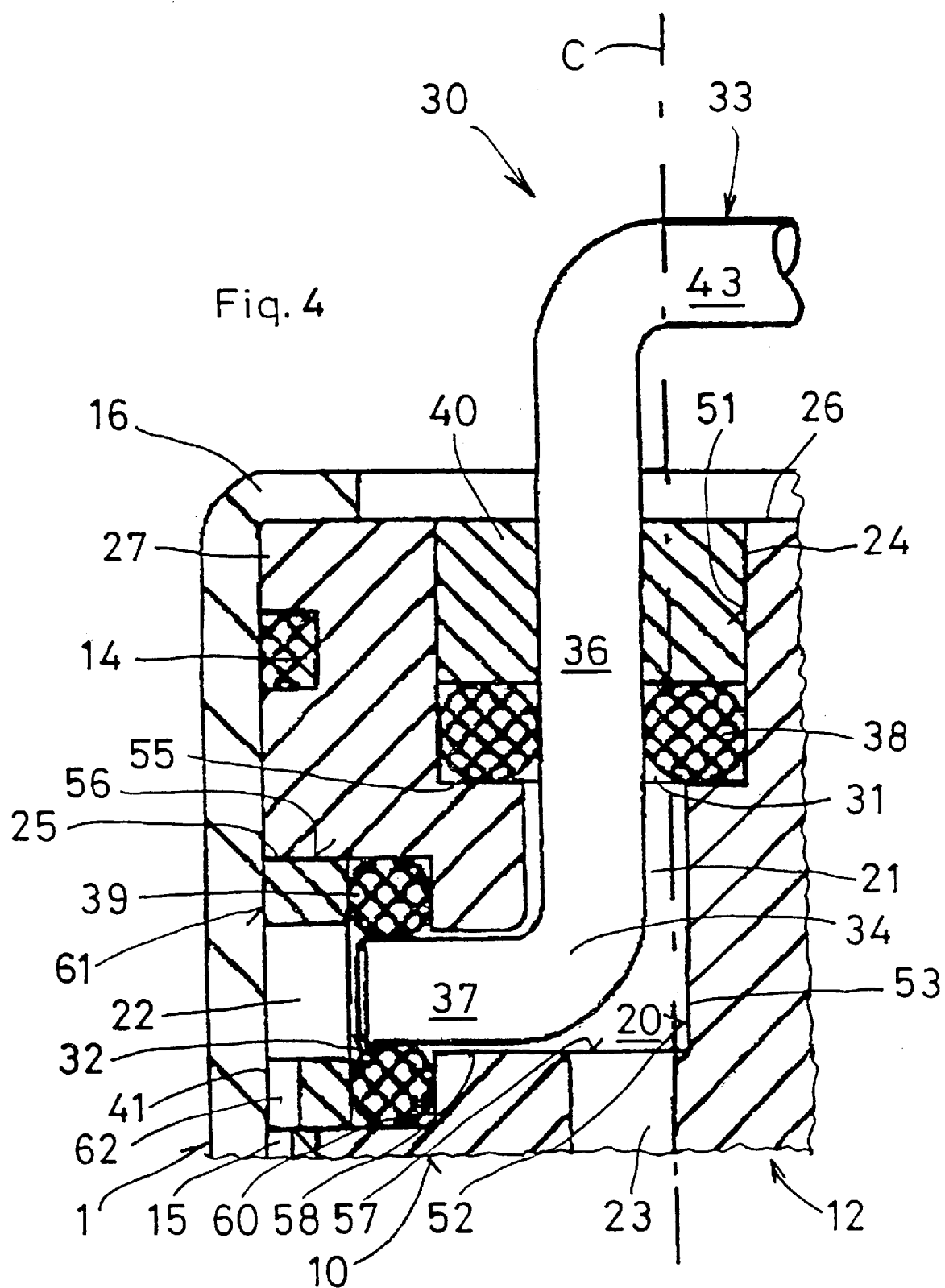

Below, embodiments of the present invention are explained in more detail on the basis of the enclosed drawings. It is shown:

FIG. 1 in a vertical, longitudinal cross-section said fluid spring, which comprises a first embodiment of the control unit, FIG. 2 an enlarged detail from FIG. 1, showing the control unit, and FIGS. 3 and 4 details of fluid springs in accordance with the fluid spring in FIG. 1, comprising further embodiments of the control unit FIG. 1 shows a fluid spring in accordance with the present invention in a vertical longitudinal cut.

This spring has a casing 1 which is below referred to as the outer piece. The main body 2 of this outer piece 1 is essentially cylindrical or tubular. On the upper section of the casing 1, the seat of a chair, the plate of a table or the like can be mounted.

The present fluid spring further comprises an inner piece 10, which also involves an essentially cylindrical or tubular main body 11 and which is inserted and positioned coaxially in the outer piece 1. The cavity 7 of the inner piece 10 comprises a piston 4 which is fixed at an upper end of the rod 5. The piston 4 divides the cavity 7 in two subareas 8 and 9, whereby one subarea 8 and 9, respectively, is located on one side of the piston 4. The piston 4 is positioned in the inner piece 10, being shiftable whilst being tightly sealed against the fluid. The terminal part of the piston rod 5 projecting from the outer piece 1 can be fitted in a pedestal or the like (not shown in the figure).

The respective terminal parts of the inner piece 10 are arranged with one end piece 12 and 13, respectively, whereby these end pieces 12 and 13 are positioned in the interior of the casing 1. Consequently, the inner piece 10 extends between the end pieces 12 and 13. The outer surface of the end pieces 12 and 13 is closed solely by the outer piece 1. The longitudinal axis of the end pieces 12 and 13 coincides with the head or longitudinal axis C of the fluid spring, as do the longitudinal axis of the casing 1 and the inner piece 10.

The assignment of the end pieces 12 and 13 to the inner piece 10 can be such as that the end pieces 12 and 13 are independent components of the fluid spring and that the end piece 12 and 13, respectively, is arranged with one front side head to tail to one front side of the inner piece 10. Alternatively, one of the end pieces and the inner piece 10 are an integral piece, whilst the other end piece is arranged or is preceding head to tail the inner piece 10. It is also conceivable, that one of the end pieces is arranged in a terminal section of the casing 1 and, optionally, is a single, integral piece with the casing 1. Upon assembly of the latter embodiment of the fluid spring in accordance with the present invention, the inner piece 10 is inserted into the casing 1 via the still open end of the casing 1. Afterwards, the second end piece is inserted into the open end of the casing 1 and this end is then shut, e.g. by flanging.

The outer surface of the inner piece 10 aligns, in tight contact or with some clearance, to the inner surface of the casing 1. Or, at least an overflow canal 15 is devised between the casing 1 and the inner piece 10. Such a canal 15 may adopt the shape of a groove or notch in the outer surface of the inner piece 10. The fourth wall of the canal 15 covering the open groove or notch is formed by a section of the inner surface of the casing 1 that is adjacent to the canal 15. Each orifice of this canal 15 is located in the area of one of the respective end pieces 12 and 13.

One of these end piece 12 is equipped with a device 30 that is controlling and enabling the overflow of fluid in the canal 15 between the subareas 8 and 9 in the inner piece 10. In the case illustrated, the upper end piece 12 is equipped with the control device 30.

The first or upper end piece 12 has an essentially cylindrically shaped main body (FIG. 2) whose outer diameter is chosen as to insert and fit this end piece 12 into one end of the casing 1. In order to seal the gap between the outer surface of this end piece 12 and the inner surface of the casing 1, a gasket ring 14 is foreseen that is partially embedded in the outer surface of the end piece 12. The end piece 12 borders the flanged margin 16 of the outer piece 1. The gasket ring 14 is located in that half of the end piece 12 that is closer to this margin 16.

That section of the outer or mantle surface of the end piece 12 which is averted from the margin 16 is equipped with an annular stage 17. The diameter of this stage 17 is devised as to comply with the insertion of the section of the end piece 12 surrounded by this stage 17 into the tubular inner piece 10. For sealing of the gap between the stage 17 and the inner piece 10, another gasket ring 18 is partially embedded in the cylindrical surface of the stage 17.

In the inside of the end piece 12 a cavity 20 is configured. This end piece-cavity 20 has a first extension 21, which extends in the direction of the main axis C or in parallel to it. This extension 21 stretches to the front and outer surface 26 of the end piece 12 which is turned away form the inner piece 10. This extension of the cavity 21 leads into the free front 26 of the end piece 12. Furthermore, the cavity 20 of the end piece has a second extension 22 that is reaching for the cylindrical side wall 27 of the end piece 12 and also opens here. The aforementioned overflow canal 15 leads and opens on its one end to this second extension of the cavity 22, more precisely adjacent to the orifice 19 of this second extension of the cavity 22.

The first and second extensions 21 and 22 of the cavity have a circular cross-section, such as that each one of these extensions 21 or 22 has a cylindrical inner surface 24 or 25. The longitudinal axis A of the first extension 21 coincides with the main axis C of the fluid spring (not illustrated) or it runs in a distance of the main axis C and in parallel to this latter. The longitudinal axis A of the first extension 21 is preferably situated between the longitudinal axis C of the end piece 12 and the fluid spring, respectively, and the orifice 19 of the second extension 22. The longitudinal axis B of the cavity's second extension 22 extends almost radially and is arranged in angle Alpha with respect to the longitudinal axis A of the first extension 21 and the main axis C of the fluid spring, respectively. The angle Alpha is smaller than 180 degrees. In the embodiment illustrated here, the angle Alpha amounts to 90 degrees.

The end piece-cavity 20 also has a third extension 23 which extends up to the front 28 of the end piece 12, said front 28 being oriented towards the interior 7 of the inner piece 10, and leads or opens here. This extension 23 may also have a circular cross-section. The longitudinal axis D of this third extension 23 can run in parallel to the longitudinal axis C of the end piece and the fluid spring, whereby the longitudinal axis of this third extension 23 of the cavity is preferably located between the longitudinal axis C of the end piece 12 and the orifice 19 of the second cavity 22.

The essential part of the control unit 30 is accommodated in the cavity 20 of the end piece 12. This control unit 30 comprises two sealing devices 31 and 32 as well as one actuating rod or actuating lever 33 assigned to these sealing devices 31 and 32 as illustrated. The first sealing device 31 is located in the cavity's first extension 21 and seals the interior 7 of the inner piece 10 towards the outside. The second sealing device 32 is located in the second extension 22 and affects the flow of fluid between the subareas 8 and 9.

The actuating lever 33 is not linear. The actuating lever 33 comprises two kinks 34 and 35 where the individual arms of the actuating lever 33 merge.

In the area of the first kink 34, which is located in the inner cavity 20, a first arm 36 and a second arm 37 of the actuating lever 33 merge. Consequently, the actuating lever 33 is L-shaped. The longitudinal-axis of the first lever-arm 36 coincides with the longitudinal axis A of the cavity's first extension 21. A section 29 of this first lever sticks out the casing from above. The longitudinal axis of the second lever-arm 37 coincides with the longitudinal axis B of the second extension 22. The lever's arms 36 and 37 enclose the same angle Alpha between the longitudinal axes A and B of the first and the second extension 21 and 22, consequently. This angle alpha amounts to 90 degrees in the embodiment illustrated here.

A sleeve 40 is placed in the orifice of the cavity's first extension, said orifice lining the front side 26 of the end piece 12. The first arm 36 of the lever 33 traverses said sleeve 40 and by this first arm 36, the lever 33 is supported in the sleeve 40. Said sleeve 40 is made of a rather hard material, as to be fixed in the cavity's first extension 21. The fixation may take place e.g. by gluing or by means of a thread. At the same time, the material of the sleeve 40 is slightly resilient as to facilitate small movements, such as the tilting of the first lever arm 36. The sleeve 40 may be made of a plastic.

The front side of the sleeve 40 that is directed towards the outside is almost plane with the outer front side 26 of the end piece 12. The length of the sleeve 40 is smaller than the length of the cavity's first extension 21. In the interior of the space thus left in the extension 21, a first sealing device 31 is arranged that comprises a sealing element 38 made from a resilient material. This sealing element 38 is ring-shaped in the present embodiment The sealing element 38 might as well have the shape of a sleeve having a smooth or jointed surface (not illustrated). A jointed surface of the sealing element 38 can be achieved e.g. by lips or the like. Similarly jointed sealing elements 38 are disclosed in a second patent application of the assignee of the present invention.

The arm 36 of the actuating lever 33 traverses the sealing element 38. The sealing element 38 fills the space in between the first lever arm 36 and the inner surface 24 of the cavity's first extension 21 and seals it off on condition that the control unit 30 is in its resting position. The sealing element 38 is located in a distance from the first kink 34 of the actuating lever 33.

The second arm 37 of the actuating lever 33 runs radially, alike the cavity's second extension 22 that is harbouring this arm 37, said arm 37 being oriented from the first arm 36 towards the inner surface 41 of the casing 1. The length of this second arm 37 is however shorter than the length of the cavity's second extension 22, such as that the front 42 of the arm 37 is positioned in a distance from the casing 1. This arm 37 supports the second sealing device 32 which comprises a second sealing element 39. This sealing element 39 fills and seals the gap between the arm 37 and the inner surface 25 of the extension 22, on condition that the control unit 30 is in a resting position. The second sealing element 39 controls the flow of fluid between the two subareas 8 and 9 in the interior of the fluid spring.

Each one of the sealing elements 38 and 39 could also correspond to a plane that is parallel to the main faces of the sealing elements 38 and 39 and is positioned in between these main faces. The plane of the respective sealing element 38 or 39 is perpendicular to the axis A or B of the orifice in the respective sealing element 38 or 39. The planes of the sealing devices 31 and 32 do not run in parallel and they are rectangular with respect to each other in the present case. Here, the plane of the first sealing device 31 that seals the interior 7 of the fluid spring towards the outside stands almost rectangularly to the longitudinal axis C of the end piece and the fluid spring, respectively.

This embodiment of the fluid spring in accordance with the present invention can be operated in the way that the par 29 of the first arm 36 protruding from the casing 1 is actuated by pushing or pulling. The second arm 37 of the L-shaped actuating lever 33 is removed from its centred position in the second extension 33 either up-or downwards. Upon this movement, a section of the second sealing element 39 is compressed between the second arm 37 and the inner surface 25 of the second extension 22. On the opponent side of the second lever arm 37, a gap is formed between the sealing element 39 and the inner surface 25 (not illustrated), through which fluid may pass. This gap renders possible that the fluid from e.g. the upper subarea 8 may flow through the third extension 39, thus passing the second sealing element 39, and further through the second extension 22, the overflow canal 15 etc. into the lower subarea 9 or vice versa.

In the present embodiment, the actuating lever 33 has a second and aforementioned kink 35 that is placed on the outside off the end piece and the fluid spring. The second kink 35 is worked on the section 29 of the first lever arm 36 that is rising up from the end piece 12, such as that a third lever arm 43 that projects from the first arm 36. The angle Beta between these arm 36 and 43 amounts to 90 degrees in the present case. Consequently, the second arm 37 and the third arm 43 run in parallel in horizontal direction. Accordingly, such an actuating lever 33 may be referred to as Z-shaped. However, said angle Beta can as well amount to more or less than 90 degrees.

Given said Z-shaped lever 33, the second arm 37 and the third arm 43 may be embedded in a common, vertical plane. Other embodiments are conceivable wherein the second arm 37 and the third arm 43 are not co-planar with respect to a single, vertical plane. In these cases, the angle Gamma (not illustrated) formed between said lever arms 37 and 43 amounts to less than 180 degrees.

Said embodiment of the present fluid spring can be operated in such a way that the third arm 43 of the Z-shaped lever 33 is swung in an approximately horizontal plane either to the left or to the right. In this case, the swivel axis of the actuating lever 33 coincides with the longitudinal axis A of the first lever arm 21. The second lever arm 37 in the second extension 22 is moved in the opposite direction, whereby a section of the sealing element 39 attached to the lever arm 37 is locally squeezed between the lever arm 37 and the inner surface 25. The fluid will then freely pass at the section of the sealing element 39 opposing said squeezed section.

Said embodiment of the fluid spring in accordance with the present invention may also be operated in such a way that the third arm 43 of the Z-shaped lever 33 is inclined or swung either up or down. Thus, the swivel axis runs horizontally and rectangular to the longitudinal axis A of the first lever arm 36. It is approximately positioned half way along the total height of the bearing sleeve 40. The second lever arm 37 in the second extension 22 is inclined in opposite direction, whereby one area of the sealing element 39 attached to this arm 37 is squeezed in the foregoing described manner. The fluid will then freely pass the sealing element 39 at the side opposing the squeezed area.

It is self-evident that the present embodiment of the fluid spring may as well be actuated in such a way that the Z-shaped lever 33 is pushed downwards or pulled up lengthwisely in the direction of the first arm 36 as mentioned before in the case of the L-shaped actuating lever 33.

In certain circumstances it may be necessary to reduce the flow rate of the fluid between the subareas 8 and 9. The reduction may be achieved e.g. by narrowing the cross-sectional lumen of the third extension 23 to the extend that the extension 23 is controlling and thus limiting the amount of fluid shuffled.

FIG. 3 displays another possible embodiment of the present fluid spring which is an improvement of the fluid spring in accordance with the FIGS. 1 and 2. This embodiment is desirable in applications which require a throttled flow of the fluid between the subareas 8 and 9 of the fluid spring. This embodiment of the fluid spring comprises only one sole canal 15 destined as an flow port for the fluid. In addition, the canal 15 is placed in that part of the casing 1 that is diametrally set apart from the opening 19 of the second extension 22.

In order to have the fluid flow between the canal 15 and the second sealing device 32, a circumferential groove 45 is worked into the outer surface of the end piece 12. This groove 45 opens to the outside and may have a rectangular cross-section. Such a groove 45 is devised with a bottom 46 that is defining the depth T of the connecting groove 45. The groove 45 runs literally orthogonally to the longitudinal axis C of the fluid spring and almost entirely circumferentially with respect to the end piece 12. The ends of the groove 45 are connected to the extension or duct 22 at mutually opposing areas of the second extension 22 in the region of the orifice 19 of said extension 22. One end of the canal 15 is connected to the circumferential groove 45, located approximately in the middle between the two ends of the canal 15. The sealing element 39 of the second sealing device 32 is located in a distance S from the inner surface 41 of the casing 1. The depth T of the groove 45 must be smaller than said distance S as to render said embodiment of the fluid spring functional.

In an accordingly devised fluid spring, the resistance to flow is considerably increased which causes a reduction of the flow rate of the fluid between the subareas 8 and 9.

In an embodiment of the fluid spring according to FIG. 3, the end piece 12 is worked integrally with the inner piece 10 as aforementioned. Projecting from the front 28 of the end piece 12 that is facing the interior 7 of the inner piece 10, the tubular main body 11 of the inner piece 10 extends axially. The main body 11 of the inner piece 10 has the same peripheral diameter as has the end piece 12.

The foregoing described shift of the first arm 36 of the Z-shaped actuating lever 33 with respect to the centred main axis C of the fluid spring results in a more efficient gearing of the lever by means of the arms 37 and 43 upon compression of the sealing element 39 in the second sealing device 32.

FIG. 4 shows a further embodiment of the fluid spring in accordance with the present invention. The first extension or duct 21 of the cavity 20 comprises two sections 51 and 52 that differ in diameter and are arranged in close succession. They may share a common axis A (FIG. 2). The first section 51 connects on one hand to the upper front 26 of the end piece 12 as described before. The remaining end of this first section 51 is assigned to one of the ends of the second section 52. The first duct section 51 comprises the aforementioned inner wall or surface 24. In this section 51, the also mentioned sealing element 38 and the sleeve 40 are located as well.

The second end of the second duct section 52 is placed in the area of the first kink 34 close to the actuating lever 33. The width of this section 52 is smaller than the width of the first section 51. If the duct sections 51 and 52 have walls 24 and 54, respectively, that are of circular shape upon cross-section view, the diameter of the wall 53 of the second section 52 will be smaller than the diameter of the wall 24 of the first section 51. Then the diameter of the inner surface 53 of the second section 52 of the cavity's extension 21 is sufficiently large, though, as to allow for movement of the arm 36 of the actuating lever 33 that is traversing this section 52.

Due to the foregoing mentioned difference in the width of the duct sections 51 and 52, a flange or annular stage 55 is at the junction of the duct sections 51 and 52. The diameter of the peripheral margin of the annular stage 55 resembles the diameter of the inner surface 24 of the first section 51. The diameter of the inner margin of the annular stage 55 resembles the diameter of the inner surface 53 of the second section 52. On top of that annular surface 55, the sealing element 38 is supported. This sealing element 38 is actually slightly compressed, being situated in between the annular surface 55 and the sleeve 40. The bearing sleeve 40 is affixed in the first section 51 of this first extension 21 of the cavity in the afore mentioned way.

The second extension or duct 22 of the cavity 20 comprises also two sections 56 and 57 that have different widths. The first duct section 56 connects both to the side wall or peripheral surface 27 of the end piece 12 in the above described way. The other end of this section 56 is arranged with one end of the second duct section 57. The first duct section 56 comprises said side wall or surface 25. The sealing element 39 mentioned before is also comprised in this duct section 56.

The second end of the second duct section 57 resides in the area of the first kink 34 of the actuating lever 33. The width of the second section 57 of this second extension 22 is smaller than the width of the first duct section 56. If the sections 56 and 57 comprise walls 25 and 58, respectively, having a circularly shaped cross-section, then the diameter of the wall 58 of the second section 57 will be smaller than the diameter of the wall 25 of the first section 56. Notwithstanding, the diameter of the inner wall 58 of the second section 57 of the second extension or duct 22 remains large enough as to accommodate the arm 37 of the actuating lever 33 traversing the second duct section 57 whilst not hampering its movements.

Due to said difference in the widths of the duct sections 56 and 57, a flange or transverse annular surface 60 exists between the sections 56 and 57. The diameter of the peripheral margin of the annular stage 60 resembles the diameter of the inner surface 25 of the first section 56. The diameter of the inner margin of the annular stage 60 resembles the diameter of the inner surface 58 of the second section 52. On top of that annular surface or front 60, the sealing element 39 is applied.

As described above, the sealing element 39 is placed in a distance from the inner surface 41 of the outer casing 1. A distance element 61 is placed in this gap. The distance element 61 shows an annular main body. The diameter of the peripheral mantle of that distance element 61 equals the diameter of the inner surface 25 of the first duct section 56. The diameter of the inner surface of the distance element 61 amounts approximately to the diameter of the inner surface 58 of the second section 57. The axial dimension of the distance ring 61 is chosen as to bridge the gap between the sealing element 39 and the inner surface 41 of the outer casing 1 by that distance ring 61 and as to achieve a slight compression of the sealing element 39 between the ring 61 and the flange 60.

As to provide a connection for flow of the fluid between the canal 15 and the cavity's second extension 22, a duct or a piece of a canal 62 is devised in the one front side of the distance ring 61 that is facing the casing 1. This canal 62 extends radially, with respect to the ring 61, between the cavity's second extension 22 and the transmitting canal 15. Since the peripheral front side of that ring 61, said side bearing the connecting canal 62, must be bent according to the inner surface of the casing 1, it is an easy task to arrange the distance ring 61 such as that the canal 62 extends between the connecting canal 15 and the cavity's second extension 22.

I claim:

1. A fluid spring with adjustable length,
    having a cylindrical casing (1) with a main axis C and comprising first and second end pieces (12,13) each placed in a respective end of the casing,
    having a piston (4) placed in the casing between said end pieces (12,13) so that said piston divides the interior space (7) of the casing (1) into subspaces (8,9),
    having a channel (15) extending between said subspaces (8,9) and
    having a control unit (30) controlling the flow of the fluid between said subspaces (8,9), whereby said control unit (30) is arranged in one of said end pieces (12,13), characterized in
    that said control unit (30) encompasses an L-shaped cavity (20) which exists in one of said end pieces (12),
    that said cavity (20) has a first extension or duct (21) an a second extension or duct (22),
    that a longitudinal axis A of the first duct (21) is parallel to or coincides with the main axis C of the casing (1),
    that a longitudinal axis B of the second duct (22) forms an angle Alpha with said main axis C, whereby the angle Alpha is smaller than 180 degrees,
    that the control unit (30) further encompasses an L-shaped actuating lever (33) having first and second arms (36,37), a respective arm (36,37) of the lever (33) being placed in a corresponding duct (21,22) of the cavity (20),
    that said lever (33) has at least one kink (34) connecting together said arms (36,37) and
    that one arm (36,37) of the actuating lever (33) is provided with at least one sealing device (31,32) sealing the gap between an interior wall (24,25) of the respective duct (21,22) and an outer surface of the corresponding arm (36,37).

2. The fluid spring according to claim 1, characterized in that said at least one sealing device comprises first and second sealing devices (31,32) arranged in planes that are orthogonal with respect to each other.

3. The fluid spring according to claim 2, characterized in that a free end of the first extension or duct (21) opens into a first front surface (26) of the first end piece (12) which faces the outside of the casing (1), that a free end of the second extension or duct (22) opens into a side wall (27) of the first end piece (12) opposing an interior surface (41) of the casing, that one end of the channel (15) opens into a space between a front face of the second sealing device (32) and the interior surface1 (41) of the casing (1), that the cavity (20) exists in the first end piece (12) has a third extension or duct (23) and that a free end of the third duct (23) opens into a second front surface (28) of the end piece (12) which faces the interior (7) of the casing (1), so that the second sealing device (32) can control the flow of fluid between the two subspaces (8,9) in the interior of the fluid spring.

4. The fluid spring according to claim 3, characterized in that the front face of the second sealing device (32) together with a front surface (42) of the second lever arm (37) are located at a distance (S) from an opening or free end (19) of the second duct (22) and consequently also from the interior surface (41) of the casing (1), so that a free space exists therebetween.

5. The fluid spring according to claim 3, characterized in that a section (29) of the first arm (36) protrudes out from the first front surface (26) of the end piece (12) for operation of the control unit (30).

6. The fluid spring according to claim 5, characterized in that a third arm (43) is connected to said protruding section (29) of the first arm (36), that the third arm (43) is connected to the first arm (36) over a second kink (35) placed on the outside of the first end piece (12), and that an angle Beta exists between the first lever arm (36) and the third lever arm (43), whereby the angle Beta amounts to of the order of 90 degrees so that such the lever is Z-shaped.

7. The fluid spring according to claim 3, characterized in that the first and second ducts (21,22) each have a cylindrical interior wall (24,25), that each sealing device (31,32) comprises at least one annular sealing element (38,39), that each sealing element (38,39) surrounds a respective arm (36,37) placed in a corresponding duct (21,22), and that the space or gap between each arm (36,37) and the inner surface (24,25) of a respective duct (21,22) is sealed by a respective sealing device (31,32) when the control unit (30) is in a nonoperating or nonactuated position.

8. The fluid spring according to claim 7, characterized in that a circumferential connecting groove (45) is provided in an outer surface of the first end piece (12), that the groove (45) has ends that open into a free space S between the second sealing device (32) and the interior surface (41) of the casing (1), that the channel (15) is placed on the opposite side of the circumference of the end piece (12), and that one end of the channel (15) opens into said groove (45), whereby the groove (45) can have a depth (T) smaller than a distance (S) between the second sealing device (32) and the interior surface (41) of the casing (1).

9. The fluid spring according to claim 3, characterized in that the longitudinal axis (A) of the first duct (21) is situated between the longitudinal axis (C) of the end piece (12) and an opening (19) of the second duct (22).

10. The fluid spring according to claim 3, characterized in that a longitudinal axis (D) of the third duct (23) is situated between the main axis (C) of the casing (12) and an opening (19) of the second duct (22).

11. The fluid spring according to claim 1, characterized in that a sleeve (40) is placed in the region of an outer orifice of the first duct (21), that the first arm (36) of the actuating lever (33) goes through said sleeve (40), and that said sleeve (40) is made of a hard but slightly resilient material, so that said sleeve can be fixed in the first duct (21) and allows small swinging movements of the first arm (36).

12. The fluid spring according to claim 11, characterized in that said sleeve (40) has an axial length that is smaller than the length of the first duct (21) and that the first sealing device (31) is placed in the interior of a space thus left in the duct (21).

13. The fluid spring according to claim 12, characterized in that the interior wall of the first duct has the shape of a cylinder and that the outer diameter of the sleeve (40) and of the first sealing means (31) corresponds to the diameter of said cylinder.

14. The fluid spring according to claim 12, characterized in that the first duct (21) comprises first and second sections (51,52), the first section having a larger diameter than the second section, that the first and second sections (51,52) follow one after another sharing the main axis A, that the first section (51) opens at one end into a first front surface (26) of the end piece (12), that the other end of this first section (51) is assigned to an interior end of the second duct section (52), that the first section (51) comprises the sealing device (31) and the sleeve (40), that a flange or annular stage (55) exists between said two sections (51,52), that the sealing device (31) has a sealing element (38) that rests on said flange (55), that a second end of the second duct section (52) is placed in the area of the at least one kink (34), and that the second section (52) has a cylindrical surface (53) with a diameter that is sufficiently large to allow a swinging movement of the first arm (36) of the actuating lever (33) that is traversing th second section (52).

15. The fluid spring according to claim 12, characterized in that the second duct (22) comprises first and second sections (56,57), the first section having a larger diameter than the second section, that the duct sections (56,57) of the second duct follow one after another sharing the longitudinal axis B, that the second section (57) of the second duct is placed close to the at least one kink (34) of the lever (33), that the diameter of the second section (57) of the second duct is large enough to allow the second arm (37) of the actuating lever (33) traversing the second section (57) of the second duct to carry out swinging movements, that the first section (56) of the second duct is placed between the second section (57) of the second duct and a free orifice (19) of the second duct (22), that a flange or transverse annular surface (60) exists between said first and second sections (56,57) of the second duct, that sealing device (32) has a sealing element (39) that rests on said flange (60), that the height of the sealing element (39) is smaller than the depth of the second section (56) of the second duct and that a distance element (61) is placed in a space between said sealing element (39) and an interior surface (41) of the casing (1).

16. The fluid spring according to claim 15, characterized in that the distance element (61) has an annular main body with a peripheral surface and an interior surface, that the peripheral surface of the distance element (61) has a diameter equal to the diameter of the inner surface (25) of the first section (56) of the second duct, that the interior surface of the annular distance element (61) has a diameter approximately equal to the diameter of the second section (57) of the second duct, that the distance element (61) has an axial length sufficient for the distance element (61) to bridge the space between the sealing element (39) and the interior surface (41) of the casing (1) and that a slight compression of the sealing element (39) between the distance element (61) and the flange (60) is achieved.

17. The fluid spring according to claim 16, characterized in that a canal section (62) exists in a front part of the distance element (61) that faces the casing (1), that the canal section (62) extends radially with respect to the longitudinal axis B, that the distance element (61) extends along the longitudinal axis B, and that the canal section (62) provides a passageway between the interior of the second duct (22) and the channel (15).

18. The fluid spring according to claim 1, characterized in that one of the end pieces (12,13) is in one piece with the casing (1).

* * * * *